United States Patent [19]

Raynes et al.

[11] 4,253,740

[45] Mar. 3, 1981

[54] LIQUID CRYSTAL MATERIALS AND DEVICES CONTAINING THEM

[75] Inventors: Edward P. Raynes; Robert A. Smith, both of Malvern, England

[73] Assignee: The Secretary of State for Defence in Her Britannic Majesty's Government of the United Kingdom of Great Britain and Northern Ireland, London, England

[21] Appl. No.: 940,758

[22] Filed: Sep. 8, 1978

[30] Foreign Application Priority Data

Sep. 12, 1977 [GB] United Kingdom ............... 37956/77

[51] Int. Cl.$^3$ .......................... G02F 1/13; C09K 3/34
[52] U.S. Cl. ................. 350/350 R; 252/299; 252/408
[58] Field of Search ............... 252/299, 408; 350/350, 350/346

[56] References Cited

U.S. PATENT DOCUMENTS

| | | |
|---|---|---|
| 3,499,702 | 3/1970 | Coldmacher et al. ............... 252/299 |
| 3,923,857 | 12/1975 | Boller et al. .......................... 252/299 |
| 3,927,064 | 12/1975 | Boller et al. .......................... 252/299 |
| 3,947,375 | 3/1976 | Gray et al. ........................... 252/299 |
| 3,954,653 | 5/1976 | Yamazaki ............................. 252/299 |
| 3,974,087 | 8/1976 | Gray et al. ........................... 252/299 |
| 3,981,817 | 9/1976 | Boller et al. .......................... 252/299 |
| 4,014,811 | 3/1977 | Totani et al. ......................... 252/299 |
| 4,031,028 | 6/1977 | Maze ................................... 252/299 |
| 4,043,935 | 8/1977 | Kanbe ................................. 252/299 |
| 4,046,708 | 9/1977 | DuBois ................................ 252/299 |
| 4,062,798 | 12/1977 | Boller et al. .......................... 252/299 |
| 4,069,167 | 1/1978 | Inukai et al. ......................... 252/299 |
| 4,096,086 | 6/1978 | Kanbe ................................. 252/299 |
| 4,103,482 | 8/1978 | Maruyama ........................... 252/299 |
| 4,120,567 | 10/1978 | Goodman et al. ................... 252/299 |
| 4,129,983 | 12/1978 | Yamazaki ............................. 252/299 |
| 4,130,502 | 12/1978 | Eidenschink et al. ............... 252/299 |
| 4,136,053 | 1/1979 | Steinstrasser et al. ............... 252/299 |
| 4,137,192 | 1/1979 | Matsufuji ............................. 252/299 |
| 4,145,114 | 3/1979 | Coates et al. ........................ 252/299 |
| 4,147,651 | 4/1979 | Oh ...................................... 252/299 |

FOREIGN PATENT DOCUMENTS

| | | |
|---|---|---|
| 2837218 | 3/1979 | Fed. Rep. of Germany ........... 252/299 |
| 2842320 | 4/1979 | Fed. Rep. of Germany ........... 252/299 |
| 2802588 | 6/1979 | Fed. Rep. of Germany ........... 252/299 |
| 105701 | 5/1974 | German Democratic Rep. ...... 252/299 |
| 132591 | 10/1978 | German Democratic Rep. ...... 252/299 |

OTHER PUBLICATIONS

Cox, R. J., et al., Mol. Cryst. Liq. Cryst., vol. 37, pp. 241–248, (1976).
Gray, G. W., et al., Electronics Letters, vol. 9, No. 26, pp. 616–617, (1973).

*Primary Examiner*—Teddy S. Gron
*Attorney, Agent, or Firm*—Stevens, Davis, Miller & Mosher

[57] ABSTRACT

A liquid crystal material having a low threshold voltage for use in displays comprises a mixture of at least three liquid cyrstal materials at least two of which are selected from the following compounds.

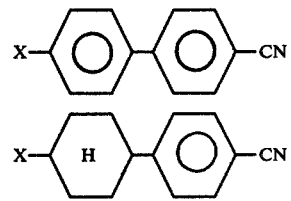

or the above compounds where in a cyclo hexane ring is substituted for one of the benzene rings, where X is a short alkyl group $C_nH_{2n+1}$ and n is an even integer, or where X is a short alkoxy group $C_mH_{2m+1}$ and m is an odd integer.

8 Claims, 3 Drawing Figures

LIQUID CRYSTAL MATERIALS AND DEVICES CONTAINING THEM

This invention relates to liquid crystal materials and devices containing them.

There are many known liquid crystal display devices. Typically they comprise a thin layer of a liquid crystal material contained between two electrode bearing glass slides. Application of a suitable electric voltage to the electrodes across the layer causes a visible change in optical property and this effect is used to display information. The electrodes may be arranged in numeric or matrix form to display e.g. time (on a watch display) or waveforms.

Liquid crystal materials may be smectic, cholesteric or nematic. This invention concerns nematic liquid crystal material or a mixture of nematic plus a small percentage of cholesteric material.

The voltage at which an effect is observed in the liquid crystal layer is often termed a threshold voltage. Normally displays are operated some way above threshold to ensure a clear display, e.g. the operating voltage may be about twice the threshold voltage.

An advantage of liquid crystal displays is their low power consumption which makes them eminently suitable for battery powered displays such as wrist watches and pocket calculators. It is therefore desirable that the threshold voltage is as low as possible so that a single low voltage battery (e.g. a standard 1.5 volt battery) may be used.

It is an object of this invention to provide a liquid crystal display having a low operating voltage.

As used herein a liquid crystal cell is defined as a layer of liquid crystal material contained between two substrates, at least one of which is transparent, with electrodes arranged on the substrate for applying an electric field across at least selected parts of the layer; the liquid crystal material may be a single compound or a mixture of compounds and may include dyes.

According to a first aspect of this invention a liquid crystal material comprises a mixture of at least three liquid crystal materials at least two of which are selected from the following compounds:

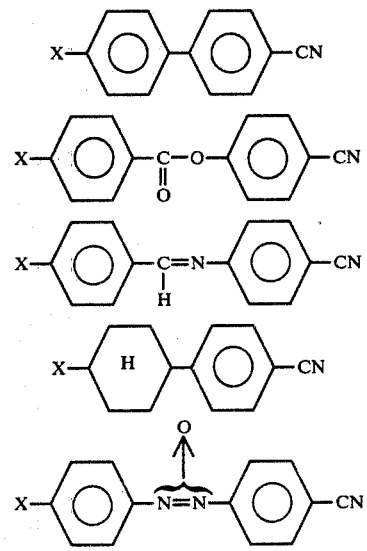

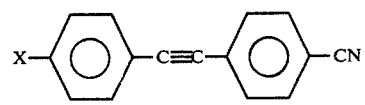

or the above compounds wherein a cyclohexane ring is substituted for one of the benzene rings, where X is a short alkyl group $C_nH_{2n+1}$ and n is an even integer, or where X is a short alkoxy group $C_mH_{2m+1}$ and m is an odd integer.

The component materials may or may not exhibit a liquid crystalline phase by themselves but exhibit a liquid crystalline phase when incorporated into other liquid crystal materials.

The mixture may include two or more components from the same compound but with different n, m values or may be mixtures of the different compounds listed above. One or more components may be a compound not satisfying the n=even, m=odd integer and may be added to enhance the nematic temperature range of the mixture. Such a compound may be e.g. 5 CT or BB15 described below.

According to a second aspect of this invention a liquid crystal display device for operating at low voltages comprises a liquid crystal cell, as hereinbefore defined, wherein the liquid crystal material comprises the mixture defined in the first aspect of the invention.

Liquid crystal materials having the general form

where X is an alkyl, alkoxy, alkanoyloxy, or alkenyl group and CN is a cyano group are described and claimed in U.K. Patent Specification No. 1,433,150, and are termed biphenyl materials.

It has been found that when n is an even integer lower threshold voltages are obtained than when n is an odd integer. Similarly when m is odd lower threshold voltages are obtained than when m is even. It has also been found that the lower values of n and m give lower operating voltages. The preferred values for low voltage operation are therefore:

n=2, 4, 6
m=1, 3, 5.

However materials with low n, m values tend to have melting points above room temperature and usually have a melting point above the isotropic temperature (clearing point), e.g. for biphenyls.

TABLE 1

| | Melting Point °C. | Clearing Point °C. |
|---|---|---|
| n | | |
| 1 | 109 | (45) |
| 2 | 75 | (22) |
| 3 | 68 | (28) |
| 4 | 46 | (16) |
| 5 | 22 | 35 |
| 6 | 13 | 27 |
| m | | |
| 1 | 104 | (85) |
| 2 | 102 | (90) |
| 3 | 72 | (64) |
| 4 | 78 | (76) |
| 5 | 48 | 68 |

TABLE 1-continued

| | Melting Point °C. | Clearing Point °C. |
|---|---|---|
| 6 | 58 | 76 |

The brackets () indicate a virtual monotropic transition.

The brackets () indicate a virtual monotropic transition.

Therefore the mixture may also contain some component materials with high n, m values (e.g. n=6, m=5) so the resulting mixture has an acceptable nematic liquid crystalline temperature range. The average value of n, m in such a mixture should be as low as possible, preferably n≦6 and m≦5. For mixtures containing alkyl and alkoxy groups the average value of n and m should still be as small as possible and preferably less than 6 or 5.

The invention will now be described by way of example only with reference to the accompanying drawings of which:

Figure 1:
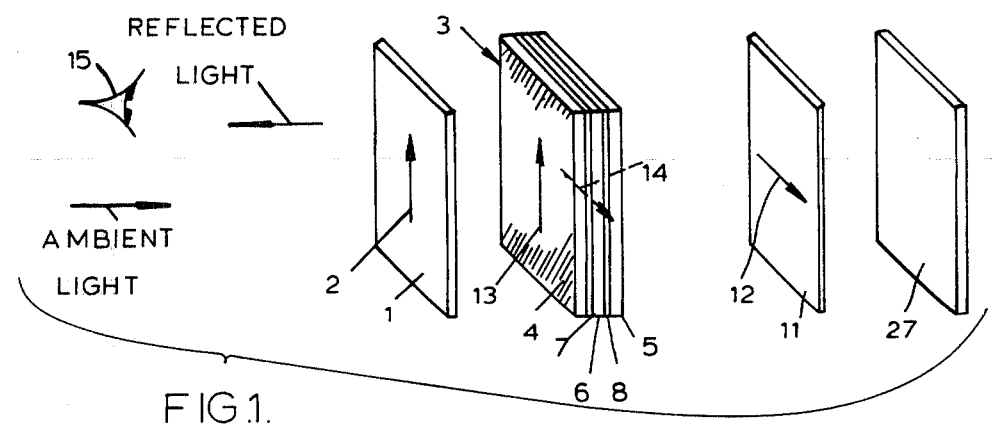
FIG. 1 is an exploded view of a twisted nematic display.

As shown in FIG. 1 a display comprises a polariser 1 arranged with its polarisation axis 2 vertical. A liquid crystal cell 3 comprises two glass slides 4, 5 containing a layer of nematic liquid crystal 6. Electrodes 7, 8 e.g. of tin oxide are arranged on the inner faces of the slides 4, 5. Behind the cell 3 is an analyser or second polariser 11 arranged with its polarisation axis 12 horizontal. A brushed aluminium reflector 27 is behind the analyser 11.

Prior to assembling the cell the slides 4, 5 are coated on their inner faces with silicon monoxide or magnesium fluoride. This coating is formed by evaporating a stream of e.g. silicon monoxide onto the slide at an angle of about 5° to the surface as for example described in U.K. Patent Specification No. 1,454,296. On assembly the slides are arranged with the evaporation direction on the two slides 4, 5, at 90° to one another. With such a coating liquid crystal molecules at the coated surface lie in a single direction (parallel to the evaporation direction) and at an angle of about 25° to 35° typically about 30° to the slide surface. Alternatively the slides may be cleaned, dipped in a solution of water and 0.2% by weight of polyvinyl alcohol (P.V.A.), and then when dry rubbed in a single direction with a soft tissue. The slides are assembled with the rubbing direction orthogonal. In this cell the liquid crystal molecules lie at about 2° to the slide surface. As a result the liquid crystal molecules progressively twist from one slide 4 to the other slide 5. Thus the plane of plane polarised light is rotated through 90° on passing through the cell 3 providing the direction 13 of the molecules at the surface of the slide 4, 5 is parallel (or perpendicular) to the polarisers axis 2, 12 respectively. Thus when zero voltage is applied to the cell light passes through the analyser 1, cell 3 and analyser 11, and is then reflected back to an observer 15.

When a suitable voltage is applied between the electrodes 7, 8 the molecules between the electrodes are caused to align parallel to the applied field and light transmitted by the polariser is transmitted without rotation to the analyser 11. Since the polariser and analyser 11 are crossed no light is transmitted to the reflector and no light is reflected back to the observer at those parts of the cell 3 between electrodes 7, 8 which therefore appear dark on a lighter background. Thus by shaping each electrode 7, 8 into say seven discrete parts separately connectable to a voltage source the number 0 to 9 may be displayed.

Figure 3:
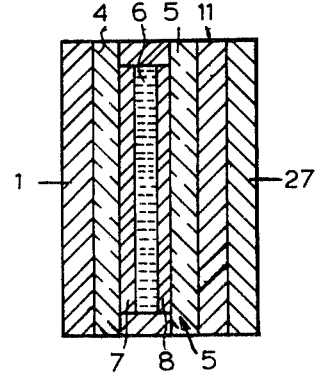
FIG. 3 is a sectional view of the display part of the watch in FIG. 2 but drawn to an enlarged scale.
Figure 2:
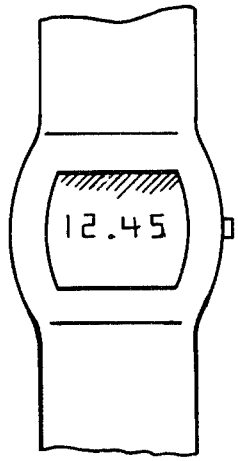
FIG. 2 is a front view of a watch having a twisted nematic liquid crystal display constructed as shown in FIG. 1.

In the watch display of FIGS. 2, 3 the electrodes 7, 8 are arranged to provide four seven bar numeric characters plus a period dot which may be arranged to pulse once per second.

The voltage required to align the molecules parallel to the applied field, ie the 'ON' state, is dependent on layer 6 thickness, materials used, temperature and surface treatment of the slides 4, 5. A typical thickness of layer is 12 μm. The material used must be stable over the temperatures of use i.e. ambient temperatures which can be assumed constant for comparison purposes. A surface treatment i.e. evaporation of silicon monoxide at 5° giving large tilt e.g. 30° of molecules reduces the voltage necessary to turn the cell 'ON' at the expense of a degraded contrast or speed.

In typical watch displays using twisted nematic liquid crystal displays a 1.5 volt battery is used to drive the oscillator and logic circuits of the watch and an up converter is used to raise the voltage to 3.0 or even 4.5 volts for operating the display.

Using nematic liquid crystal materials according to this invention the operating voltage require to drive the liquid crystal display may be reduced to e.g. 1.25 to 1.40 volts.

Small amounts of a cholesteric material may be added to the nematic liquid crystal to give a long pitch cholesteric material. To avoid a patchy appearance it is then preferable to match the cholesteric pitch to the relative alignment on the slides 4, 5 as taught in U.K. Pat. Ser. No. 1,472,247.

As an example about 1% of C.15 cholesteric cyano biphenyl (marketed by British Drug Houses) may be added to a nematic material. The material C.15 has the formula

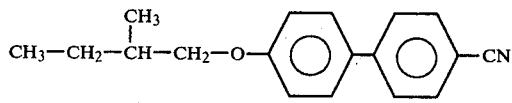

The following table shows examples of nematic mixtures and operating voltage necessary for 10% transmission i.e. almost fully ON of normally incident light through a cell prepared and operated as follows:

(i) layer thickness 12 μm, slides coated with SiO₂, drive voltage 1 KH₃ sine wave, layer temperature 22° C.;

(ii) layer thickness 7 μm, slides PVA coated and rubbed, drive voltage 100 H₃ square wave, layer temperature 22° C.

Percentages are by weight.

TABLE 2

| | Mixture | Operating (i) | Voltage (ii) |
|---|---|---|---|
| 1 | E.7[5CB(51%)/7CB(25%)/8OCB(16%)/5CT(8%)] | 1.70 | 2.15 |

TABLE 2-continued

| Mixture | | Operating (i) | Voltage (ii) |
|---|---|---|---|
| 2 | 2CB(10%)/6CB(80%)/5CT(10%) | 1.25 | — |
| 3 | 6CB(65%)/10CB(9%)/3OCB(15%)5CT(11%) | 1.35 | 1.77 |
| 4 | 2CB(10%)/6CB(60%)/7OCB(20%)/5CT(10%) | 1.40 | — |
| 5 | 2CB(10%)/6CB(56%)/10CB(6%)/3OCB(10%)/ 5OCB(10%)5CT(8%) | — | 1.47 |
| 6 | 2CB(15%)/4CB(15%)/6CB(43%)/10CB(3%)/3OCB(12%)/ 5CT(7%)/BB15(5%) | — | 1.53 | where

2CB is $C_2H_5$—⬡—⬡—CN

4CB is $C_4H_9$—⬡—⬡—CN

5CB is $C_5H_{11}$—⬡—⬡—CN

6CB is $C_6H_{13}$—⬡—⬡—CN

7CB is $C_7H_{15}$—⬡—⬡—CN

1OCB is $CH_3O$—⬡—⬡—CN

3OCB is $C_3H_7O$—⬡—⬡—CN

5OCB is $C_5H_{11}O$—⬡—⬡—CN

7OCB is $C_7H_{15}O$—⬡—⬡—CN

8OCB is $C_8H_{17}O$—⬡—⬡—CN

5CT is $C_5H_{11}$—⬡—⬡—⬡—CN

BB15 is $C_5H_{11}$—⬡—⬡—C(=O)—O—⬡—⬡—CN

The display of FIGS. 1, 2, 3 may be modified by replacing the reflector 27 with a partial reflector and having a beta light or low power tungsten bulb behind the partial reflector so that the display can be observed by light transmission (instead of light reflection) when ambient light is not available.

What I claim is:

1. A liquid crystal material comprising a mixture of at least three liquid crystal compounds at least two of which compounds are represented by the formula

X—⬡—⬡—CN where X is a short alkyl group $C_nH_{2n+1}$, n=2, 4, or 6, or the alkoxy group $C_mH_{2m+1}O$, m=1, 3, or 5.

2. A material according to claim 1 and further comprising an amount of

$C_5H_{11}$—⬡—⬡—⬡—CN for enhancing the nematic temperature range.

3. A material according to claim 1 and further comprising an amount of

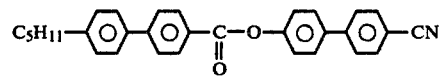

$C_5H_{11}$—⬡—⬡—C(=O)—O—⬡—⬡—CN for enhancing the nematic temperature range.

4. A material according to claim 1 and further comprising a small quantity of a cholesteric liquid crystal material.

5. A material according to claim 4 wherein the cholesteric material is a cholesteric cyano biphenyl material.

6. A liquid crystal device comprising a layer of liquid crystal material contained between two substrates at least one of which is transparent, an electrode structure arranged on the substrates for applying an electric field across at least selected parts of the layer, wherein the liquid crystal material is the material claimed in claim 1.

7. A material according to claim 1 and further comprising an amount of at least one material having the general formula

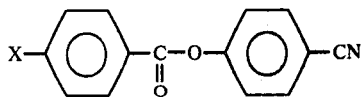

where X is a short alkyl group $C_nH_{2n+1}$ where n is 2, 4 or 6 or a short alkoxy group $C_mH_{2m+1}O$ where m is 1, 3, or 5.

8. A liquid crystal material comprising a mixture of at least three liquid crystal materials at least two of which are selected from the following compounds

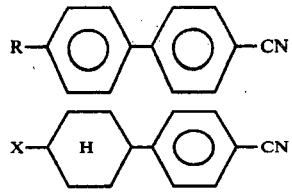

where R is a short alkyl group $C_nH_{2n+1}$ where n is 2, 4 or 6 or the alkoxy group $CH_3O$, X is a short alkyl group $C_nH_{2n+1}$ where n is 2, 4, or 6 or a short alkoxy group $C_mH_{2m+1}O$ where m is 1, 3 or 5.

* * * * *

UNITED STATES PATENT AND TRADEMARK OFFICE
CERTIFICATE OF CORRECTION

PATENT NO. : 4,253,740

DATED : March 3, 1981

INVENTOR(S) : Raynes et al

It is certified that error appears in the above-identified patent and that said Letters Patent are hereby corrected as shown below:

Column 5, Claim 1, line 60, "or the alkoxy group $C_mH_{2m+1}O$, m = 1,3, or 5" should be deleted.

Column 8, Claim 8, first formula, "R" should be changed to ---X---,

Column 8, Claim 8, second formula, "X" should be changed To ---R---.

Column 8, Claim 8, in the first line after the formulas "R" has been changed to -- X --.

Column 8, Claim 8, in the second line after the formulas the phrase "or the alkoxy group $CH_3$, X" has been deleted and -- , R -- has been substituted therefor.

Signed and Sealed this

Eighth Day of December 1981

[SEAL]

Attest:

GERALD J. MOSSINGHOFF

*Attesting Officer*     *Commissioner of Patents and Trademarks*